United States Patent
Bolshakov

(10) Patent No.: US 12,079,111 B2
(45) Date of Patent: Sep. 3, 2024

(54) AUTOMATIC DETECTION OF SOFTWARE DEPLOYMENT ERRORS

(71) Applicant: SAP SE, Walldorf (DE)

(72) Inventor: Alexander Bolshakov, Mühlhausen (DE)

(73) Assignee: SAP SE, Walldorf (DE)

( * ) Notice: Subject to any disclaimer, the term of this patent is extended or adjusted under 35 U.S.C. 154(b) by 113 days.

(21) Appl. No.: 18/054,622

(22) Filed: Nov. 11, 2022

(65) Prior Publication Data
US 2024/0160557 A1 May 16, 2024

(51) Int. Cl.
*G06F 11/36* (2006.01)
*G06F 8/60* (2018.01)

(52) U.S. Cl.
CPC ............ *G06F 11/3664* (2013.01); *G06F 8/60* (2013.01); *G06F 11/3692* (2013.01)

(58) Field of Classification Search
None
See application file for complete search history.

(56) References Cited

U.S. PATENT DOCUMENTS

| | | | | |
|---|---|---|---|---|
| 2011/0145789 A1* | 6/2011 | Rasch | ................ | G06F 9/44505 717/121 |
| 2012/0117532 A1* | 5/2012 | Knepper | .................... | G06F 8/61 717/176 |
| 2015/0121155 A1* | 4/2015 | Boshev | ............... | H04L 41/0893 714/48 |
| 2015/0347264 A1* | 12/2015 | Mohammed | ........ | G06F 9/45558 714/45 |
| 2015/0356002 A1* | 12/2015 | Arif | ..................... | G06F 11/3692 714/38.1 |
| 2017/0109685 A1* | 4/2017 | Bianchi | .......... | G06Q 10/063118 |
| 2019/0155674 A1* | 5/2019 | Dhayapule | ............ | G06F 11/079 |
| 2019/0278693 A1* | 9/2019 | Tatikonda | ............ | G06F 11/3692 |

\* cited by examiner

*Primary Examiner* — Qing Chen
(74) *Attorney, Agent, or Firm* — Mintz Levin Cohn Ferris Glovsky and Popeo, P.C.

(57) ABSTRACT

A method, a system, and computer program product for automatic implementation of solutions for deployment errors in continuous integration and continuous deployment pipelines. A deployment log including a deployment error indicating a failure to deploy a software product including a software configuration at a computing device comprising a computing device configuration is received. The deployment error is processed to determine a pattern of the deployment error. A match between the deployment error and a past deployment error is determined based on the pattern of the deployment error and a frequency of occurrence of the pattern within a set interval of time. An output indicating a solution for the deployment error is provided based on the match between the deployment error and the past deployment error. The solution for the deployment error is implemented by modifying the software configuration or the computing device configuration.

20 Claims, 4 Drawing Sheets

AUTOMATIC DETECTION OF SOFTWARE DEPLOYMENT ERRORS

TECHNICAL FIELD

The subject matter described herein relates generally to software deployment and more specifically to automatic implementation of solutions for deployment errors in continuous integration and continuous deployment pipelines.

BACKGROUND

Automatic execution of continuous integration and continuous deployment (CI/CD) processes are widely used nowadays. The deployment processes include automatic deployment, configuration of software systems, and execution of automatic tests. Sometimes CI/CD pipelines fail because of different reasons, some of which might be difficult to avoid. For example, the complexity of overall system setup can depend on many different components, some of which have a variable version that can affect the CI/CD pipelines stability. The pipeline failures need to be resolved before the product can be deployed into a production environment where it becomes available for use.

SUMMARY

Systems, methods, and articles of manufacture, including computer program products, are provided for tracking software deployment to assist with solving deployment errors. In one aspect, there is provided a system. The system can include at least one data processor and at least one memory. The at least one memory can store instructions that cause operations when executed by the at least one data processor. The operations can include: receiving a deployment log including a deployment error indicating a failure to deploy a software product including a software configuration at a computing device including a computing device configuration, processing the deployment error to determine a pattern of the deployment error, determining a match between the deployment error and a past deployment error based on the pattern of the deployment error and a frequency of occurrence of the pattern within a set interval of time, providing an output indicating a solution for the deployment error based on the match between the deployment error and the past deployment error, and implementing the solution for the deployment error by modifying the software configuration or the computing device configuration.

In some variations, one or more features disclosed herein including the following features can optionally be included in any feasible combination. The operations further include: opening a ticket in a ticketing system configured to initiate a process to search for the solution for the deployment error. The operations further include: generating a record including the deployment error and the solution for the deployment error. The record updates the frequency of the occurrence of the deployment error. The pattern is associated with a software feature of the software configuration. The pattern is associated with a computing device feature of the computing device configuration. The solution includes a modification of software feature of the software configuration or the computing device feature of the computing device configuration based on the pattern.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that can include one or more processors and one or more memories coupled to the one or more processors. A memory, which can include a non-transitory computer-readable or machine-readable storage medium, can include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to web application user interfaces, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Implementations of the present disclosure are generally directed to software deployment and more specifically to assisting with solving continuous integration and continuous deployment (CI/CD) pipeline errors. When software deployment errors occur in a computing system a deployment log can be generated. The deployment log can include software deployment errors indicating a failure to deploy a software product at a component of the computing system. The overall setup of computing system can be very complex and can depend on many components. Some computing components can have a fixed version and other computing components can vary. The variable computing components are called "moving parts." In some environments, especially in cloud computing environments the "moving parts" can have a significant effect on the CI/CD pipeline stability, leading to software deployment errors. Some software deployment errors can happen due to occurrence of identical or similar issues. Current deployment errors can be matched with past deployment errors based on the pattern of the deployment errors. The match between current and past deployment errors can be used to automatically identify solutions for troubleshooting the current deployment errors to successfully complete software deployment. The pattern match can reveal which issue happened without spending time on in-depth analysis on current deployment errors. The knowledge about the issue that triggered the current deployment error can be used, for example, in generating a product release decision.

Software deployment errors, including repeated software deployment errors and including software deployment errors with similar issues, can be transmitted to parties assigned to solve them. In some cases, troubleshooting software deployment errors could require significant efforts to solve. Traditional identification and implementation of solutions that correctly resolve the root cause can take extensive time periods (e.g., weeks or months) that delay completion of software deployment. Troubleshooting of transient software deployment errors associated with variable computing components can require new solutions, as a difference to troubleshooting repeated software deployment errors. Automatic processing of software deployment errors combined with automatic implementation of solutions based on software deployment error patterns can increase troubleshooting efficiency by minimizing the time needed to identify and implement solutions to successfully complete software deployment.

Figure 1:
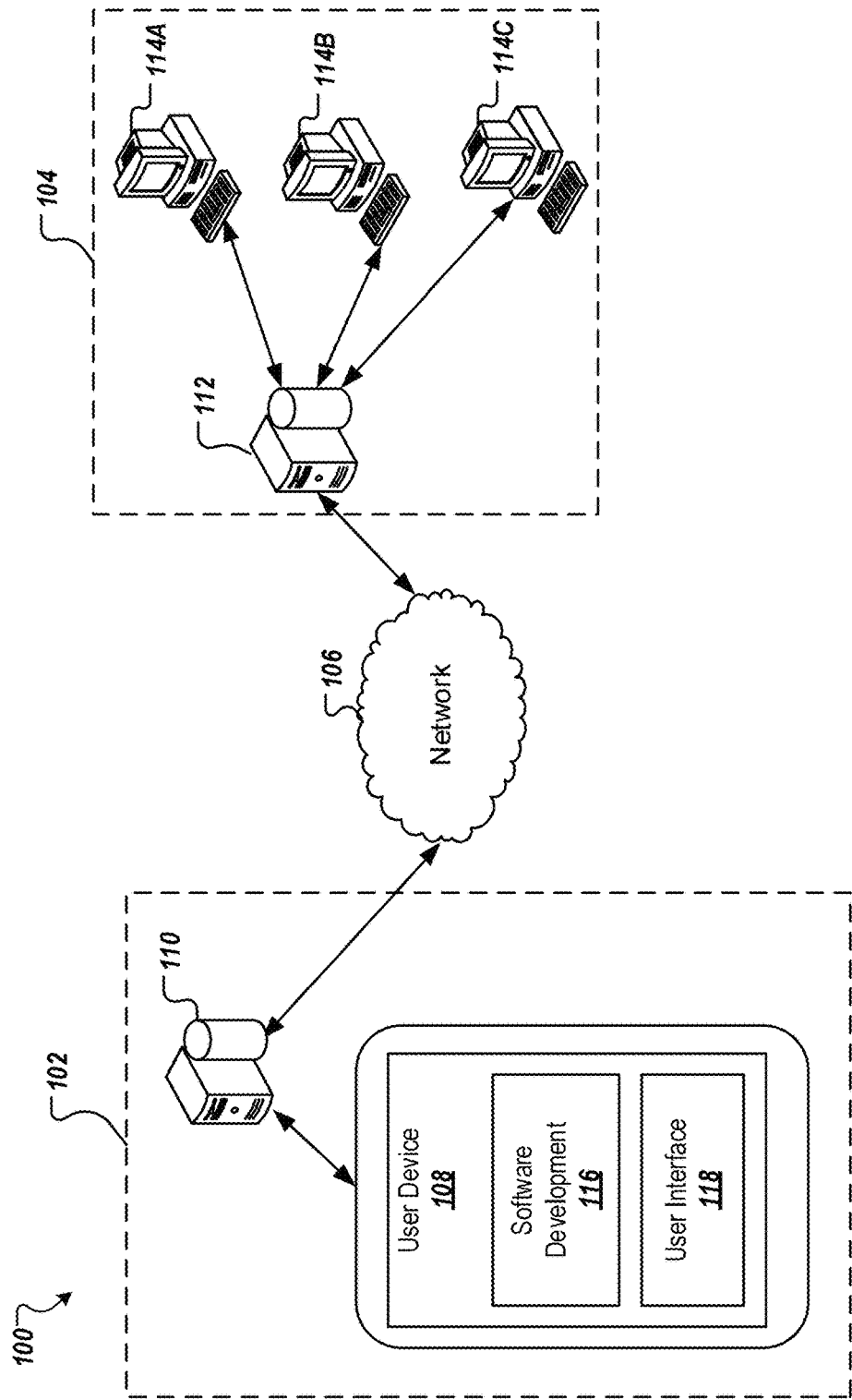
FIG. 1 depicts a diagram of an example system, in accordance with some example implementations.

FIG. 1 depicts a diagram of an example system 100, for addressing software deployment errors, in accordance with some example implementations. The example system 100 can include a development system 102, a deployment system 104 and a network 106. The development system 102 includes one or more user devices 108 and one or more server devices 110. The deployment system 104 includes one or more server devices 112 and multiple computing devices 114A, 114B, 114C. The example system 100 can include a plurality of software development and deployment trackers, which can be deployed across different remote systems, such as the development system 102 and the deployment system 104.

In some implementations, the one or more server devices 110 can include a development tracker and the one or more server devices 112 can include a deployment tracker. In some implementations, each server device 110, 112 includes at least one server and at least one data store configured to store data associated with past deployment errors including deployment error patterns. In the example of FIG. 1, the server devices 110, 112 are intended to represent various forms of servers including, but not limited to a web server, an application server, a proxy server, a network server, and/or a server pool. In general, server systems accept requests for application services and provides such services to any number of user devices (e.g., the user device 108 and computing devices 114A, 114B, 114C) over the network 106.

In accordance with implementations of the present disclosure, the server device 110 can include a development management system configured to manage the development of a software product, portions of the software product being developed by one or more user devices 108. The server device 110 can host a development tracking service (e.g., provided as one or more computer-executable programs executed by one or more computing devices) configured to track software development executed at the user device 108. The development tracker included in the one or more server devices 110 can be connected to the user device 108, which can be associated with a software developer. In the depicted example, the user device 108 includes a software development module 116 and a user interface 118. The software development module 116 can be configured to enable creation and modification of software products. The user interface 118 can enable an entry of a user input to initiate deployment of the new or modified software product and a display of deployment results including deployment logs.

The software development module 116 can interact with an application that is hosted by the one or more server devices 110 of the development system 102 to develop the software product to be deployed. The development tracking service of the server device 110 can use as input data provided by the user device 108. The server device 110 can process the input data through a software development and deployment service to provide result data (e.g., a deployment package for completed software products). For example, the server device 110 can send the result data to the server device 112 over the network 106, which can coordinate and track software deployment throughout the computing system including each computing device 114A, 114B, 114C. The one or more server devices 112 can include a deployment management system configured to transmit the software product to one or more computing devices 114A, 114B, 114C. The one or more server devices 112 can track the deployment of the software product to the one or more computing devices 114A, 114B, 114C. The deployment tracker deployed at the one or more server devices 112 can be connected to each of the computing devices 114A, 114B, 114C. The computing devices 114A, 114B, 114C can be associated with end users.

The user device 108 and/or the computing devices 114A, 114B, 114C can be and/or include any type of processor and memory based device, such as, for example, cellular phones, smart phones, tablet computers, laptop computers, desktop computers, workstations, personal digital assistants (PDA), network appliances, cameras, enhanced general packet radio service (EGPRS) mobile phones, media players, navigation devices, email devices, game consoles, or an appropriate combination of any two or more of these devices or other data processing devices. In some implementations, at least two of the computing devices 114A, 114B, 114C include different computing system configurations, such as different operating systems, different processing capabilities, different hardware components, and/or other differences. As shown in FIG. 1, the user device 108 can be communicatively coupled with the server devices 112 to track software deployment, via the network 106. It should be appreciated that the network 106 can be any wired and/or wireless network including, for example, a public land mobile network (PLMN), a local area network (LAN), a wide area network (WAN), the Internet, a cellular network, a telephone network (e.g., PSTN) or an appropriate combination thereof connecting any number of communication devices, mobile computing devices, fixed computing devices, server systems, and/or the like. The user device 108 and/or the computing devices 114A, 114B, 114C can include any combination of fixed and variable computing components.

In some example implementations, the development tracker of the server device 110 can interact with the deployment tracker of the server device 112 in order to coordinate the development and deployment of a software product. The software creation and/or update can include one or more features. Furthermore, each feature can require one or more changes to the existing software product. A product specification object can include a plurality of feature objects corresponding to the features of the software update. The feature object can include a plurality of change objects that can correspond to the changes required to implement the feature corresponding to the feature object. The development of the software update can include implementing these features by at least completing the tasks that are required to effect the changes associated with each feature.

According to some example implementations, the development tracker of the server device 110 and the deployment tracker of the server device 112 can generate and/or maintain a plurality of hierarchical tracking objects corresponding to the software creation and/or update as well as its features and required changes. For example, the development tracker of the server device 110 can maintain a first plurality of tracking objects and the deployment tracker of the server device 112 can maintain a second plurality of tracking objects including patterns of deployment errors. It should be appreciated that a tracking object can be a running computer process configured to interact with one or more other tracking objects. As used herein, a computer process can be an instance of a computer program that is being executed.

A tracking object at the development tracker of the server device 110 can interact with a corresponding tracking object at the deployment tracker of the server device 112 in order to track, for example, the completion of a task required to realize a change associated with a feature of the software creation and/or update to enable successful software deployment at each of the computing devices 114A, 114B, 114C. The server device 112 can generate a deployment log including deployment errors indicating a failure to deploy the software product at one or more of the computing devices 114A, 114B, 114C. Any of the server devices 110, 112 can be configured to extract the deployment errors from the deployment log and match the extracted deployment errors to past deployment errors based on deployment error patterns to identify a solution to correct the deployment error. Any of the server devices 110, 112 can be configured to implement the solution (e.g., modify the software product and/or a setting of one or more variable or static components of the computing devices 114A, 114B, 114C) to successfully complete the software deployment.

Figure 2:
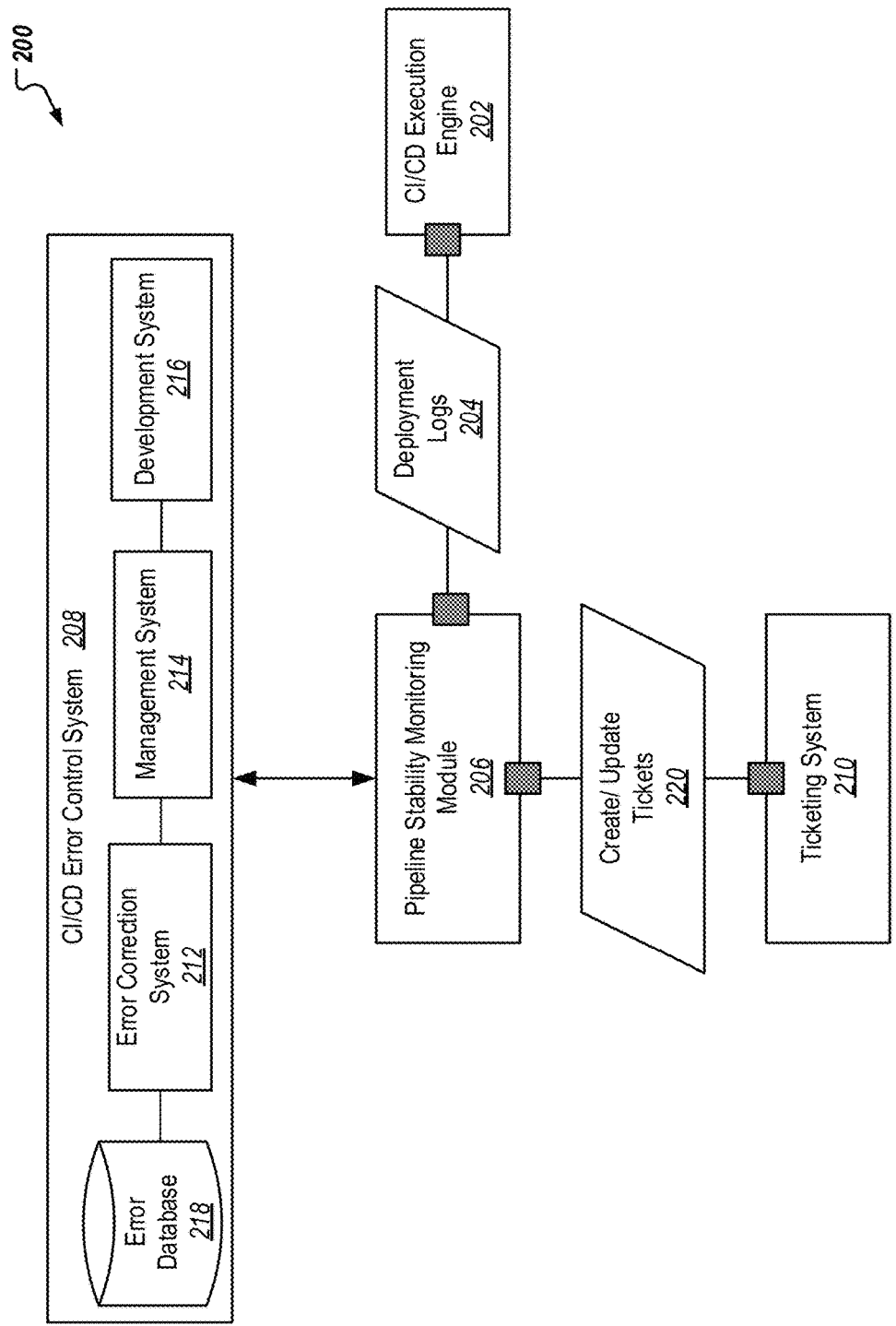
FIG. 2 depicts an example conceptual architecture, in accordance with some example implementations.

FIG. 2 depicts an example conceptual architecture 200 configured for an interaction between system components to automatically address deployment errors, in accordance with some example implementations. The example conceptual architecture 200 includes a CI/CD execution engine 202, a pipeline stability monitoring module 206, CI/CD error control system 208, and a ticketing system 210. The CI/CD execution engine 202 can maintain a software production specification and deployment logs 204 corresponding to a new software product or a software update. In some example implementations, the CI/CD execution engine 202 can be configured to automate the deployment of the software update corresponding to the product specification object. For example, the CI/CD execution engine 202 can include a deployment engine configured to perform sequential or parallel deployment of each change that is made in order to implement the features of the software update in each computing device.

The CI/CD execution engine 202 can manage a plurality of tracking objects that can be integrated in or connected to computing device where a (portion of) software product is deployed. For example, the CI/CD execution engine 202 can manage a deployment iteration object that interacts with the product specification object at the CI/CD execution engine 202. The deployment tracker can also manage a task log object, which can interact with a feature object at the CI/CD execution engine 202. Furthermore, the task log object can include a plurality of task objects. Each task object can correspond to a deployment task scheduled to be completed. For example, a first task object can define a deployment task scheduled to be completed at a particular computing device, in order to effect the change associated with a corresponding change object of the software product. A second task object can correspond to a task scheduled to be completed in order to realize the change associated with a second change object different from the first task object. Alternatively and/or additionally, a third task object can correspond to a task scheduled to be completed in order to realize the change associated with a third change object. As such, the first task object, the second task object, and the third task object can interact in parallel or sequentially, respectively, with the first change object, the second change object, and the third change object at the particular computing device to complete a deployment of the software product.

The CI/CD execution engine 202 can be implemented in a server device (e.g., server device 112) of the deployment system (e.g., deployment system 104), the server device being configured to manage a deployment process. If the CI/CD execution engine 202 determines that an error has occurred in connection with a deployment request, the CI/CD execution engine 202 writes an error message as deployment logs 204 in a file. The error message identifies the particular error that occurred. The deployment logs 204, formatted as a file, can include information related to deployment errors identifying a portion of the software product that generated the error in a particular computing device (e.g., computing devices 114A, 114B, 114C) managed by the server device. The information collected in the deployment logs 204 can include system log files corresponding to processes executed by computing devices (identified according to system configurations), as well as information generated by server devices of the deployment system managing the deployment process.

The deployment logs 204 are transmitted to the pipeline stability monitoring module 206. The pipeline stability monitoring module 206 can serve as a progress monitor that reports to the CI/CD error control system 208 and communicates with the ticketing system 210. Even though, the pipeline stability monitoring module 206 is illustrated in FIG. 2 as being separate from the CI/CD error control system 208, in some implementations, the pipeline stability monitoring module 206 can be included in the CI/CD error control system 208. For instance, the pipeline stability monitoring module 206 can monitor and/or report the progress of a deployment associated with an error included in the deployment logs 204. In response to determining that the deployment associated with a portion of a software product on a particular computing device failed, the pipeline stability monitoring module 206 can transmit the deployment logs 204 including the deployment error to the CI/CD error control system 208.

The CI/CD error control system 208 includes an error correction system 212, a management system 214, a development system 216, and a deployment error database 218. The deployment logs 204 received by the CI/CD error control system 208 can be directed by the management system 214 to the error correction system 212. The error correction system 212 can process the deployment errors to determine a pattern of the deployment error. The error correction system 212 can retrieve past deployment errors from the deployment error database 218.

The error correction system 212 can search though past deployment errors, to identify a match between the current deployment error included in the deployment log and a past deployment error based on the pattern of the deployment errors. In some implementations, the deployment error patterns are being analyzed using a model. The model can include one or more machine learning models trainable to generate the deployment error pattern matches. The one or more machine learning models can be trained, recalibrated, and updated to generate deployment error pattern matches with increased accuracy even for computing systems with variable components. The deployment error pattern matches can be used to automatically correct deployment errors with repeated patterns, while new patterns are used for retraining the model. The provided solution can include a machine learning model that can be applied to most types of computing device configurations and software product configurations.

If a match between the current deployment error and a past deployment error is found, the error correction system 212 can retrieve from the deployment error database 218 a solution associated with the matching past deployment error. The error correction system 212 can automatically transmit the solution for the current deployment error to the management system 214. The management system 214 can transmit the solution for the current deployment error to the pipeline stability monitoring module 206. The pipeline stability monitoring module 206 can transmit the solution for the current deployment error to the CI/CD execution engine 202 to automatically implement the solution to correct the current deployment error.

If a match between the current deployment error and a past deployment error is not found, the error correction system 212 can transmit a search result to the management system 214 to mark the current deployment error as an error with a new pattern. The management system 214 can transmit to the pipeline stability monitoring module 206 a request for a ticket for the current deployment error. The pipeline stability monitoring module 206 can communicate with the ticketing system 210, to generate new tickets 220. The pipeline stability monitoring module 206 can transmit the error to the ticketing system 210, which can create and/or update tickets 220. The new ticket can be transmitted by the pipeline stability monitoring module 206 to the CI/CD error control system 208.

The management system 214 can transmit the current deployment error with the associated ticket to the development system 216 to request user input to identify a solution for the current deployment error. The development system 216 can transmit the solution for the current deployment error to the management system 214. The management system 214 can transmit the solution for the current deployment error to the pipeline stability monitoring module 206. The pipeline stability monitoring module 206 can transmit the solution for the current deployment error to the CI/CD execution engine 202 to automatically implement the solution to correct the current deployment error. If the implementation of the solution leads to successful deployment of the software product, the solution is transmitted, by the management system 214, to be stored in the deployment error database 218.

In some example implementations, where the CI/CD execution engine 202 determines that the corresponding change of a proposed solution did not successfully deploy the software product, the CI/CD execution engine 202 can generate an updated deployment log that adds the corresponding error associated with the failed solution. The pipeline stability monitoring module 206 can communicate with the ticketing system 210 to update the ticket 220, which is transmitted to the CI/CD error control system 208 to initiate an iterative implementation of the solution to address the current deployment error until the software product is successfully deployed on the computing device. After the iterative solution is successfully implemented, leading to successful deployment of the software product, the iterative solution is transmitted, by the management system 214, to be stored in the deployment error database 218, becoming accessible for future error pattern matches.

Figure 3:
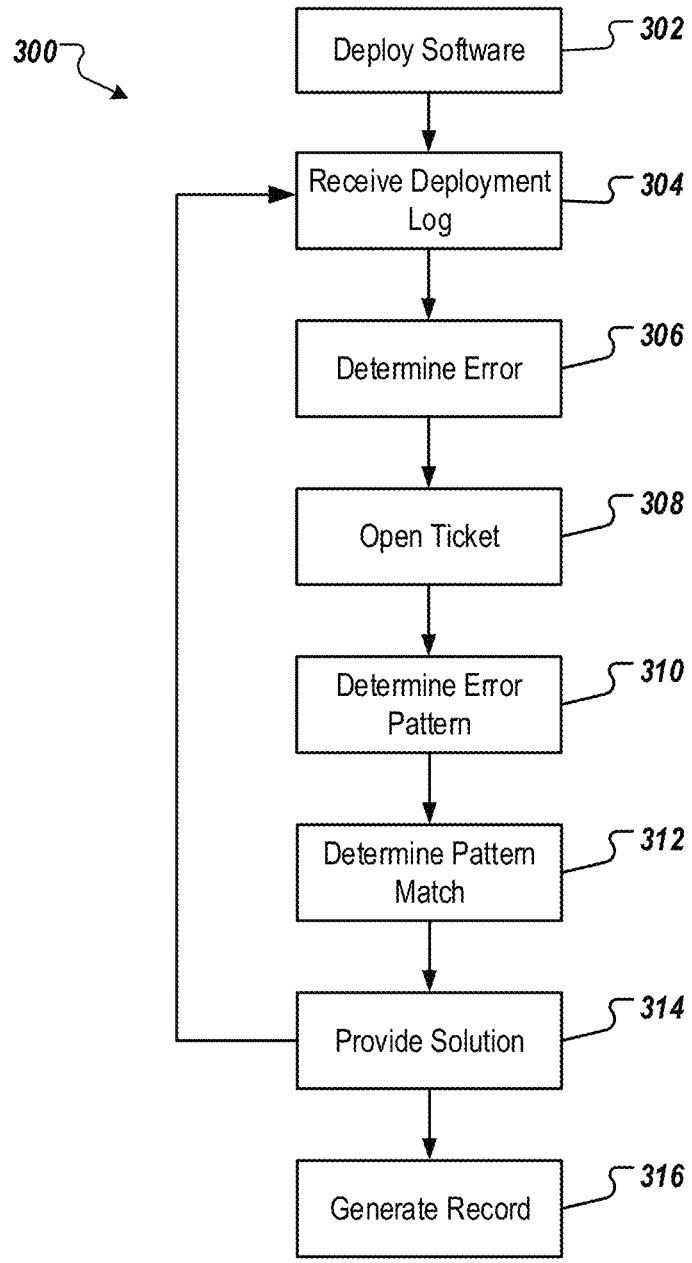
FIG. 3 depicts a flowchart illustrating an example process, in accordance with some example implementations.

FIG. 3 depicts a flowchart illustrating an example of a process 300 for automatically addressing software deployment errors, in accordance with some example implementations. The process 300 can be performed by server device 110, 112 described with reference to FIG. 1 or one or more components (e.g., the error correction system 212) of the CI/CD error control system 208 described with reference to FIG. 2.

At 302, a software product is deployed at a computing system including one or more computing devices having a particular configuration, such as particular operating systems, particular processing capabilities, particular hardware components, particular user controls and/or particular user access levels. The software product can include a new software or a software update of an older version of a software already installed in the computing device. The software product can include a software product configuration including multiple software product features. At least a portion of the software product features can be associated with one or more computing device configuration requirements (e.g., minimum processing resources, data storage capacity, RAM, etc. that are needed to execute the computer-executable code with a particular a software product configuration). For example, the software product configuration can include a feature defining a minimum capability of the computing device to enable installation and/or execution of a function included in the software product on the computing device. In some implementations, the software configuration can include a class definition identifying a connection between software product modules according to class hierarchies, class parameters used to configure a computing device for the deployment of the software product to customize the computing device hosting deployment, and function requirements defining minimum processing capabilities of the computing device configuration for deployment and execution of the software product. In some implementations, the computing device configuration can include computing module (platform) definitions that facilitate the deployment of new or update software products. Each computing platform definition is associated with an individual computing module, describing the processing capabilities of the computing module and the access level required for a user to initiate deployment of the software product. Each segmented computing module can be uniquely identifiable via a unique identifier such as, e.g., a unique addressable namespace. Segmenting computing platforms also allows for efficient evaluation of the performance of a computing platform to identify necessary modifications for deployment of the software product with a particular software configuration.

At 304, a text readable file including a deployment log is received from a CI/CD execution engine or can be downloaded from the cloud environment that executes the application under test. The deployment log can include one or more deployment errors generated by the CI/CD execution engine tracking the deployment of the software product throughout a computing system including multiple computing devices with fixed and/or variable components. The deployment log can include expressions that describes the symptoms associated with the deployment errors and deployment error identifiers. The deployment error identifiers can include a software identifier and a device identifier. The software identifier can identify (a component) of the software product that failed to be deployed. The software product can include multiple components. Each software component can depend on one or more services. The device identifier can identify the computing device where the (component) of the software product failed to be deployed. The device identifier can be indicative of the computing device configuration of the computing device, where the (component) of the software product failed to be deployed.

At 306, the deployment log is processed to determine the one or more deployment errors that were generated during the failed deployment of the software product at a particular computing device. In some implementations, the deployment log includes multiple deployment errors that are related to each other defining a complex deployment failure. Each of the deployment errors included in the deployment log can be individually extracted to be separately processed, such that each symptom associated with a deployment error is separately processed.

At 308, the deployment error is automatically processed to determine a pattern of the one or more deployment errors. For example, the symptoms associated with the deployment errors, the software configuration, and the computing device configuration are processed to determine the pattern of the corresponding deployment error. The pattern can be associated with a system feature including one or more parameters of the device configuration and/or the pattern can be associated with a feature of the software product including one or more parameters of the software configuration.

At 310, it is determined whether the deployment error can be matched to a past deployment error that was successfully solved, based on the pattern of the respective deployment error. The deployment error pattern matches can be identified using a deployment error pattern processing model. The deployment error pattern processing model can include one or more machine learning models trainable to identify deployment error pattern matches. The one or more machine learning models can be trained, recalibrated, and updated to be trained to identify deployment error pattern matches. In some implementations, a single deployment error pattern match can be selected to avoid overlapping patterns that could lead to potential errors in solution selection.

At 312, after performing deployment error matching, a request is generated to automatically open a ticket by a ticketing system. The ticket can include information about the ticket to indicate whether the deployment error has a pattern matching a past deployment error (corresponding to a repeated issue) or not. A new ticket can be generated for new errors (that do not match any past deployment errors) or an existing ticket can be updated for a pre-existing deployment error or repeated errors.

At 314, a solution can be provided based on the deployment error pattern matches to generate a compatibility between the software configuration and the computing device configuration. Providing the solution can include implementing a modification of a feature of the software product based on the matching pattern and deploying the software product with the updated feature to the computing device to complete deployment. For example, computing platforms of a computing device can be segmented to enable efficient deployment of the software product with a particular software configuration. The solutions for deployment error patterns that repeatedly occur a number of times within a particular time interval can be automatically implemented to correct deployment errors with matching patterns. The machine learning model can learn associations between deployment error patterns and solutions (e.g., actions taken during deployment of a software component at a computing device and whether a solution to correct a deployment error with a particular pattern matching a current deployment error pattern was successful or failed). The machine learning model can use supervised learning, unsupervised learning, deep learning, or other machine learning techniques for pattern matching and solution selection. In some implementations, the machine learning model can include a recommendation system that uses the results of the machine learning model to recommend one or more actions for a CI/CD execution engine to automatically correct the deployment errors expected to most likely lead to a successful deployment and to reduce a time to deployment in a production release. In some implementations, in response to deploying the software product with the updated feature to the computing device, an outcome of the successful completion of the deployment can be generated or the process 300 can return to receiving an updated deployment log.

At 316, a record associated with a successful correction of the deployment error (leading to successful completion of the updated software deployment) is generated and transmitted for storage in a deployment error database. The record can include an automatic report with an overview of all deployment errors occurred in particular time period. The record can be available for the management and developers. The record can include the names of the issues, links to the tickets, links to the deployment logs of all occurrences of a particular deployment error, regular expressions used to detect the respective deployment errors and a number of deployment error occurrences within a particular time period (e.g., last 3-9 months or last 1-3 years).

Figure 4:
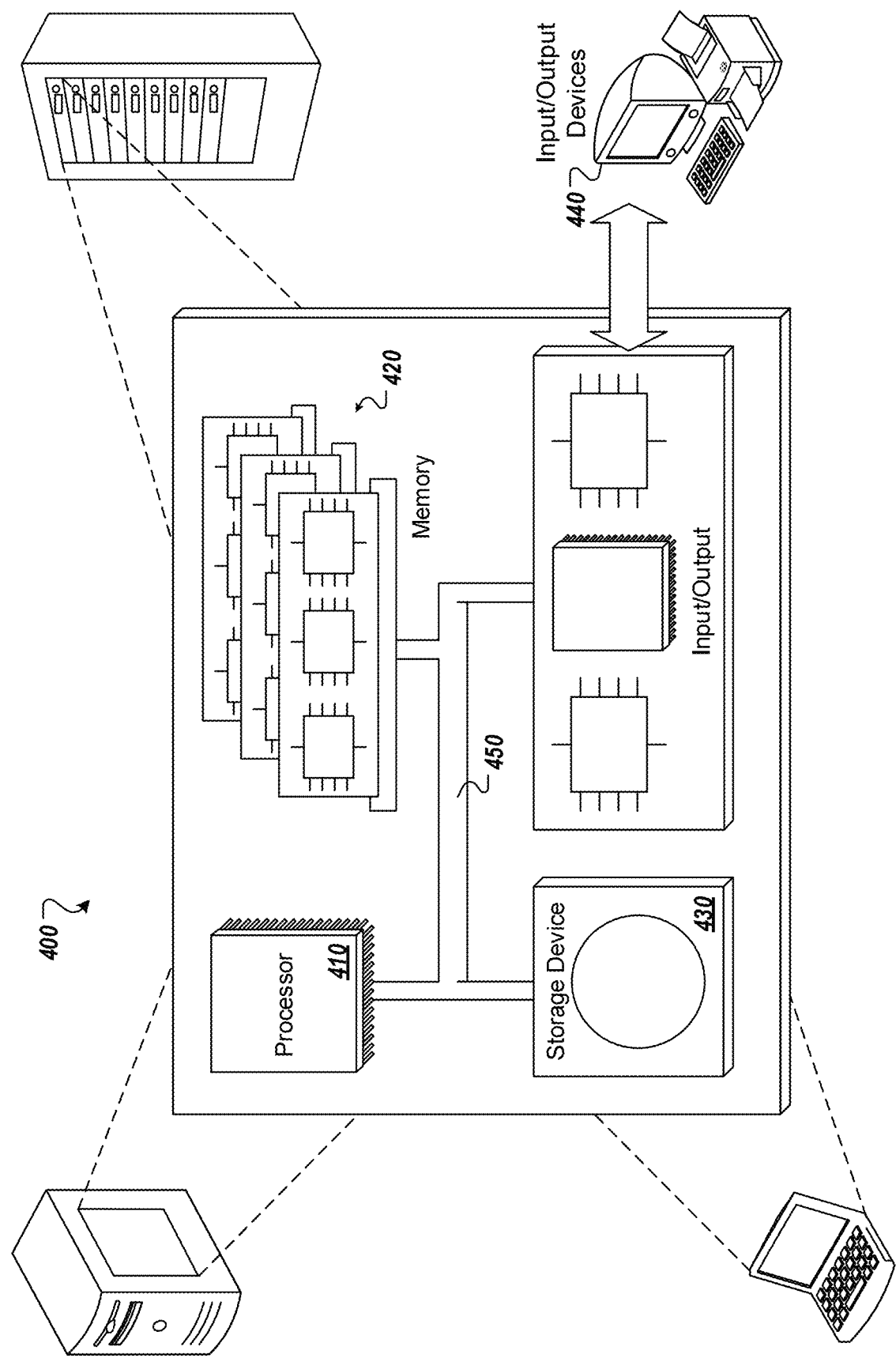
FIG. 4 depicts a block diagram illustrating a computing system, in accordance with some example implementations.

Referring now to FIG. 4, a schematic diagram of an example computing system 400 is provided. The system 400 can be used for automatically addressing software deployment errors, as described in association with the implementations described herein. For example, the system 400 can be included in any or all of the server components discussed herein with reference to FIGS. 1 and 2. The system 400 includes a processor 410, a memory 420, a storage device 430, and an input/output device 440. The components 410, 420, 430, 440 are interconnected using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the system 400. In one implementation, the memory 420 is a computer-readable medium. In one implementation, the memory 420 is a volatile memory unit. In another implementation, the memory 420 is a non-volatile memory unit. The storage device 430 is capable of providing mass storage for the system 400. In one implementation, the storage device 430 is a computer-readable medium. In various different implementations, the storage device 430 can be a floppy disk device, a hard disk device, an optical disk device, or a tape device. The input/output device 440 provides input/output operations for the system 400. In one implementation, the input/output device 440 includes a keyboard and/or pointing device. In another implementation, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps can be provided, or steps can be eliminated, from the described flows, and other components can be added to, or removed from, the described systems. Accordingly, other implementations are within the scope of the following claims.

A number of implementations of the present disclosure have been described. Nevertheless, it will be understood that various modifications can be made without departing from the spirit and scope of the present disclosure. Accordingly, other implementations are within the scope of the following claims.

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system can include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" can occur followed by a conjunctive list of elements or features. The term "and/or" can also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

Further non-limiting aspects or embodiments are set forth in the following numbered examples that can be implemented in any combination:

Example 1: A method, comprising: receiving, by one or more processors, a deployment log comprising a deployment error indicating a failure to deploy a software product comprising a software configuration at a computing device comprising a computing device configuration; processing, by the one or more processors, the deployment error to determine a pattern of the deployment error; determining, by the one or more processors, a match between the deployment error and a past deployment error based on the pattern of the deployment error and a frequency of occurrence of the pattern within a set interval of time; providing, by the one or more processors, an output indicating a solution for the deployment error based on the match between the deployment error and the past deployment error; and implementing, by the one or more processors, the solution for the deployment error by modifying the software configuration or the computing device configuration.

Example 2: The computer-implemented method of example 1, further comprising: opening, by the one or more processors, a ticket in a ticketing system configured to initiate a process to search for the solution for the deployment error.

Example 3: The computer-implemented method of example 1 or 2, further comprising: generating, by the one or more processors, a record comprising the deployment error and the solution for the deployment error.

Example 4: The computer-implemented method of any of examples 1 to 3, wherein the record updates the frequency of the occurrence of the deployment error.

Example 5: The computer-implemented method of any of examples 1 to 4, wherein the pattern is associated with a software feature of the software configuration.

Example 6: The computer-implemented method of any of examples 1 to 5, wherein the pattern is associated with a computing device feature of the computing device configuration.

Example 7: The computer-implemented method of any of examples 1 to 6, wherein the solution comprises a modification of software feature of the software configuration or the computing device feature of the computing device configuration based on the pattern.

Example 8: A non-transitory computer-readable storage medium comprising programming code, which when executed by at least one data processor, causes operations comprising: receiving a deployment log comprising a deployment error indicating a failure to deploy a software product comprising a software configuration at a computing device comprising a computing device configuration; processing the deployment error to determine a pattern of the deployment error; determining a match between the deployment error and a past deployment error based on the pattern of the deployment error and a frequency of occurrence of the pattern within a set interval of time; providing an output indicating a solution for the deployment error based on the match between the deployment error and the past deployment error; and implementing the solution for the deployment error by modifying the software configuration or the computing device configuration.

Example 9: The non-transitory computer-readable storage medium of example 8, wherein the operations further comprise: opening a ticket in a ticketing system configured to initiate a process to search for the solution for the deployment error.

Example 10: The non-transitory computer-readable storage medium of example 8 or 9, wherein the operations further comprise: generating a record comprising the deployment error and the solution for the deployment error.

Example 11: The non-transitory computer-readable storage medium of any of examples 8 to 10, wherein the record updates the frequency of the occurrence of the deployment error.

Example 12: The non-transitory computer-readable storage medium of any of examples 8 to 11, wherein the pattern is associated with a software feature of the software configuration.

Example 13: The non-transitory computer-readable storage medium of any of examples 8 to 12, wherein the pattern is associated with a computing device feature of the computing device configuration.

Example 14: The non-transitory computer-readable storage medium of any of examples 8 to 13, wherein the solution comprises a modification of software feature of the software configuration or the computing device feature of the computing device configuration based on the pattern.

Example 15: A system comprising: at least one data processor; and at least one memory storing instructions, which when executed by the at least one data processor, cause operations comprising: receiving a deployment log comprising a deployment error indicating a failure to deploy a software product comprising a software configuration at a computing device comprising a computing device configuration; processing the deployment error to determine a pattern of the deployment error; determining a match between the deployment error and a past deployment error based on the pattern of the deployment error and a frequency of occurrence of the pattern within a set interval of time; providing an output indicating a solution for the deployment error based on the match between the deployment error and the past deployment error; and implementing the solution for the deployment error by modifying the software configuration or the computing device configuration.

Example 16: The system of example 15, wherein the operations further comprise: opening a ticket in a ticketing system configured to initiate a process to search for the solution for the deployment error.

Example 17: The system of example 15 or 16, wherein the operations further comprise: generating a record comprising the deployment error and the solution for the deployment error, wherein the record updates the frequency of the occurrence of the deployment error.

Example 18: The system of any of examples 15 to 17, wherein the pattern is associated with a software feature of the software configuration.

Example 19: The system of any of examples 15 to 18, wherein the pattern is associated with a computing device feature of the computing device configuration.

Example 20: The system of any of examples 15 to 19, wherein the solution comprises a modification of software feature of the software configuration or the computing device feature of the computing device configuration based on the pattern.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed is:

1. A computer-implemented method comprising:
receiving, by one or more processors, a deployment log comprising a deployment error indicating a failure to deploy a software product comprising a software configuration at a computing device comprising a computing device configuration;
processing, by the one or more processors, the deployment error to determine a pattern of the deployment error;
determining, by the one or more processors, a match between the deployment error and a past deployment error based on the pattern of the deployment error and a frequency of occurrence of the pattern of the deployment error within a set interval of time;
providing, by the one or more processors, an output indicating a solution for the deployment error based on the match between the deployment error and the past deployment error; and
implementing, by the one or more processors, the solution for the deployment error by modifying the software configuration or the computing device configuration.

2. The computer-implemented method of claim 1, further comprising:
opening, by the one or more processors, a ticket in a ticketing system configured to initiate a process to search for the solution for the deployment error.

3. The computer-implemented method of claim 1, further comprising:
generating, by the one or more processors, a record comprising the deployment error and the solution for the deployment error.

4. The computer-implemented method of claim 3, wherein the record updates the frequency of the occurrence of the pattern of the deployment error.

5. The computer-implemented method of claim 1, wherein the pattern of the deployment error is associated with a software feature of the software configuration.

6. The computer-implemented method of claim 1, wherein the pattern of the deployment error is associated with a computing device feature of the computing device configuration.

7. The computer-implemented method of claim 1, wherein the solution comprises a modification of a software feature of the software configuration or a computing device feature of the computing device configuration based on the pattern of the deployment error.

8. A non-transitory computer-readable storage medium storing programming code, which when executed by at least one data processor, causes operations comprising:
receiving a deployment log comprising a deployment error indicating a failure to deploy a software product comprising a software configuration at a computing device comprising a computing device configuration;
processing the deployment error to determine a pattern of the deployment error;
determining a match between the deployment error and a past deployment error based on the pattern of the deployment error and a frequency of occurrence of the pattern of the deployment error within a set interval of time;
providing an output indicating a solution for the deployment error based on the match between the deployment error and the past deployment error; and
implementing the solution for the deployment error by modifying the software configuration or the computing device configuration.

9. The non-transitory computer-readable storage medium of claim 8, wherein the operations further comprise:
opening a ticket in a ticketing system configured to initiate a process to search for the solution for the deployment error.

10. The non-transitory computer-readable storage medium of claim 8, wherein the operations further comprise:
generating a record comprising the deployment error and the solution for the deployment error.

11. The non-transitory computer-readable storage medium of claim 10, wherein the record updates the frequency of the occurrence of the pattern of the deployment error.

12. The non-transitory computer-readable storage medium of claim 8, wherein the pattern of the deployment error is associated with a software feature of the software configuration.

13. The non-transitory computer-readable storage medium of claim 8, wherein the pattern of the deployment error is associated with a computing device feature of the computing device configuration.

14. The non-transitory computer-readable storage medium of claim 8, wherein the solution comprises a modification of a software feature of the software configuration or a computing device feature of the computing device configuration based on the pattern of the deployment error.

15. A system comprising:
at least one data processor; and
at least one memory storing instructions, which when executed by the at least one data processor, cause operations comprising:
receiving a deployment log comprising a deployment error indicating a failure to deploy a software product comprising a software configuration at a computing device comprising a computing device configuration;
processing the deployment error to determine a pattern of the deployment error;
determining a match between the deployment error and a past deployment error based on the pattern of the deployment error and a frequency of occurrence of the pattern of the deployment error within a set interval of time;
providing an output indicating a solution for the deployment error based on the match between the deployment error and the past deployment error; and
implementing the solution for the deployment error by modifying the software configuration or the computing device configuration.

16. The system of claim 15, wherein the operations further comprise:
opening a ticket in a ticketing system configured to initiate a process to search for the solution for the deployment error.

17. The system of claim 15, wherein the operations further comprise:
generating a record comprising the deployment error and the solution for the deployment error, wherein the record updates the frequency of the occurrence of the pattern of the deployment error.

18. The system of claim 15, wherein the pattern of the deployment error is associated with a software feature of the software configuration.

19. The system of claim 15, wherein the pattern of the deployment error is associated with a computing device feature of the computing device configuration.

20. The system of claim 15, wherein the solution comprises a modification of a software feature of the software configuration or a computing device feature of the computing device configuration based on the pattern of the deployment error.

* * * * *